United States Patent
Asokan et al.

[11] Patent Number: 6,163,571
[45] Date of Patent: Dec. 19, 2000

[54] METHOD FOR MEASURING RECEIVED SIGNAL QUALITY IN A MOBILE WIRELESS COMMUNICATION SYSTEM

[75] Inventors: Ram Asokan; Kumar Balachandran, both of Cary, N.C.

[73] Assignee: Ericsson Inc., Research Triangle Park, N.C.

[21] Appl. No.: 09/065,708

[22] Filed: Apr. 24, 1998

[51] Int. Cl.[7] .............................. H04B 3/46; H04B 17/00
[52] U.S. Cl. ............................................ 375/225; 375/340
[58] Field of Search .................................... 375/224, 225, 375/227, 262, 340, 341; 371/43

[56] References Cited

U.S. PATENT DOCUMENTS

| | | | |
|---|---|---|---|
| 5,278,404 | 1/1994 | Yeats | 250/214 C |
| 5,414,737 | 5/1995 | Uesugi et al. | 375/225 |
| 5,581,577 | 12/1996 | Abe | 372/225 |
| 5,781,588 | 7/1998 | Abe et al. | 375/225 |

*Primary Examiner*—Tesfaldet Bocure
*Attorney, Agent, or Firm*—Coats & Bennett, PLLC

[57] ABSTRACT

A received signal processing circuit for a receiver in a digital communication system uses a re-encode and compare scheme to measure received signal quality. The received signal is demodulated and decoded to produce an estimate of the original information bit sequence. The estimate of the information bit sequence is re-encoded using the same channel code as the transmitter. The re-encoded bits are compared to the demodulated bits output from the demodulator to yield an initial estimate of the channel bit error rate caused by the communication channel. Bias in th4e initial estimate of the channel bit error rate is removed to produce a refined estimate of the channel bit error rate.

29 Claims, 5 Drawing Sheets

METHOD FOR MEASURING RECEIVED SIGNAL QUALITY IN A MOBILE WIRELESS COMMUNICATION SYSTEM

FIELD OF THE INVENTION

The present invention relates to mobile wireless communication systems and, more particularly, to signal quality measurements made by a mobile station in a mobile wireless communication system.

BACKGROUND OF THE INVENTION

In a typical mobile wireless communication system, received signal quality (RXQUAL) is measured by the mobile station and used for a number of purposes. Received signal quality is used by the mobile station and base station, for example, to adjust its transmit power level in order to maintain the established link. When the channel conditions are good, the received signal quality will be relatively high, and the mobile station and base station will reduce its transmit power to reduce co-channel and adjacent channel interference. Reduction of the transmit power of the mobile station also saves battery power. As channel conditions worsen, received signal quality will decline assuming no change is made in the transmit power level. This decline will be reflected in the bit error rate which is often used by proxy to estimate received signal quality. When there is a decline in the received signal quality (or an increase in the error rate), the mobile station and base station will increase its transmit power to maintain some predetermined minimum signal quality standard.

There are many schemes used to estimate the bit error rate or received signal quality. One technique is to estimate the carrier to noise (C/N) ratio and then to map the C/N ratio to a bit error ratio or signal quality band. This scheme is very well suited for analog radio systems. One disadvantage, however, is that this scheme gives very poor performance at low C/N ratios.

Another technique is known as the re-encode and compare technique. In this scheme, the output of the channel decoder is re-encoded and compared with the demodulated bits (the received bits before the channel decoder). This comparison yields an estimate of the channel bit error rate. The estimated bit error rate of the channel is then mapped to a signal quality band.

The re-encode and compare scheme yields better performance than the C/N estimation technique described above at low C/N ratios. One trade-off, however, is that at low bit error rates, the re-encode and compare scheme needs large measurement periods (i.e., a larger number of bits) to estimate the bit error rate.

The re-encode and compare scheme is not without disadvantages. The performance of the re-encode and compare scheme depends on the amount of bit errors occurring after channel decoding. If there are no bit errors after channel decoding, the re-encode and compare scheme gives an accurate estimate of the channel bit error rate. However, the performance of the re-encode and compare scheme degrades as the number of bit errors occurring after channel decoding increase. Often, the performance of the re-encode and compare scheme may not be sufficient to meet the system requirements. Another disadvantage is that the re-encode and compare scheme needs a very low code rate (high coding gain) channel coder. Since the channel coder is specified for the system, this is not always possible.

A modified version of the re-encode and compare scheme is known which attempts to overcome some of its disadvantages. The modified re-encode and compare technique is essentially the same as previously described except that the re-encoding and comparison are done only for frames that pass a CRC check following the channel decoder. That is, a CRC check is performed on the output of the channel decoder before the output is re-encoded and compared to the demodulated bits.

The modified re-encode and compare scheme provides better performance than the conventional approach. However, the modified re-encode and compare scheme can be used only in cases where CRC bits are used for error detection. Hence, it may not always be possible to implement the modified re-encode and compare scheme. Another drawback is that the modified re-encode and compare scheme skips frames that fail the CRC check. There may not be sufficient frames left over one measurement period to estimate the channel bit error rate. In such case, it may be necessary to increase the measurement period and/or the number of frames which is not always possible.

Some systems will have CRC protection for only a few important bits. For example, the transmitter bits may be divided into two classes (referred to herein as class 1 bits and class 2 bits). The number of class 1 bits, which are protected by a CRC code, is relatively small as compared to the total number of bits. Since the CRC is applied for a relatively small number of bits, the received burst after frame erasure can still have bit errors. Also, it is possible that the erased frames can have fewer bit errors than the CRC passed frames. In these cases, the modified re-encode and compare scheme may not improve performance.

Accordingly, there is need for further improvement in the re-encode and compare scheme to estimate the channel bit error rate and/or received signal quality.

SUMMARY OF THE INVENTION

The present invention is an improved re-encode and compare scheme for measuring received signal quality in a digital communication system. A received signal is demodulated and decoded to produce an estimate of the original information bit sequence. The estimate of the information bit sequence is re-encoded and compared to the received bit sequence output from the demodulator. This comparison yields an initial estimate of the channel bit error rate. This initial estimate contains a bias which depends on the number of bit errors that remain after decoding.

The initial estimate of the channel bit error rate is input into a bias removal unit. The function of the bias removal unit is to remove bias in the initial estimate of the channel bit error rate. Bias adjustments for various signal levels and channel conditions are stored in a bias table. The bias removal unit uses the bias adjustments stored in memory to modify the initial estimate of the channel bit error rate thereby producing a refined estimate of the channel bit error rate. The refined estimate of the channel bit error rate is output to a control and signaling unit, or to a mapping unit which maps the channel bit error rate to a signal quality band.

By removing bias in the estimate of the channel bit error rate, the present invention improves performance as compared to prior art re-encode and compare schemes. Improved performance can be obtained even when part of the bits in each transmitted frame is protected by a block code. In this case, all bits, including protected and unprotected bits, are re-encoded and compared to the bits output from the demodulator.

Other objects and advantages of the present invention will become apparent and obvious from a study of the following description and the accompanying drawings which are merely illustrative of such invention.

DETAILED DESCRIPTION OF THE INVENTION

Figure 1:
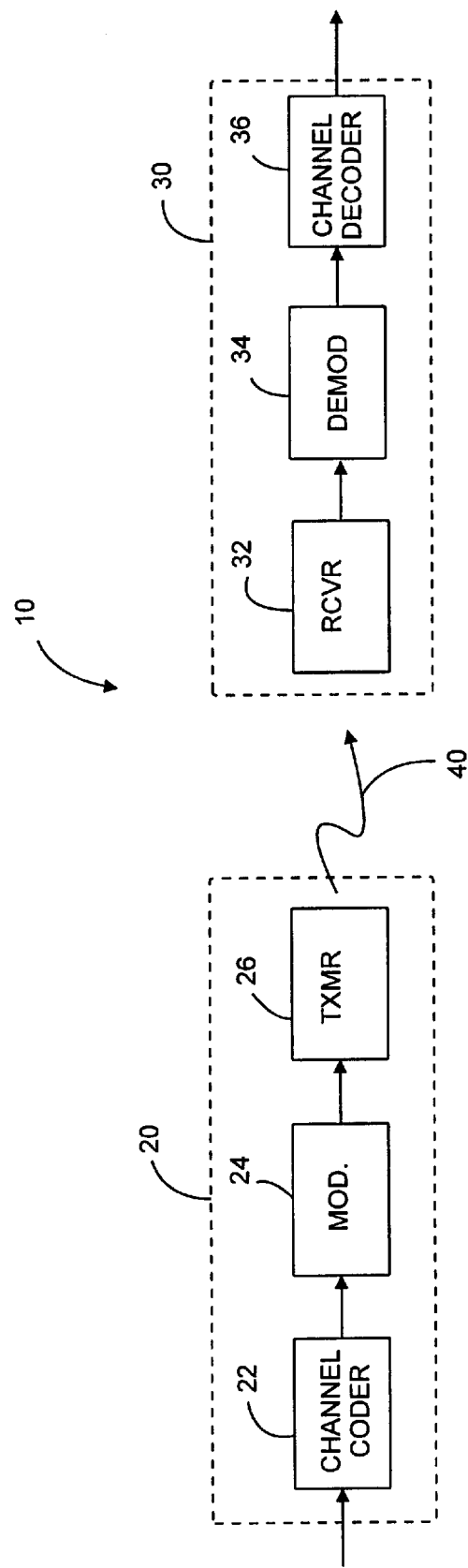
FIG. 1 is a block diagram of a digital communication system.

Referring now to the drawings, the method for making signal quality measurements of the present invention will be described. The signal quality measurement method of the present invention is used in a digital communication system as shown in FIG. 1. The digital communication system is indicated generally by the numeral 10. The digital communication system 10 includes a transmitting station 20 and a receiving station 30 connected by a communications channel 40. The transmitting station 20 sends data via the communication channel 40 to the receiving station 30. The communication channel 40 may for example be a radio frequency channel such as that used in a mobile communication system.

The transmitting station 20 typically includes an encoder 22, a modulator 24, and a transmitter 26. The encoder 22 receives an information bit sequence from an information source and inserts redundant bits into the information bit sequence to enable error-detection and/or correction at the receiving station 30. The output of the encoder 22 is an encoded bit sequence called a code word. The modulator 24 transforms the coded bits output from the encoder 22 into a form that can be accepted by a communication channel 40. For example, where the communication channel 40 is a RF channel, the modulator 24 converts the transmitted bit sequence into a waveform that can be transmitted over the RF channel. The transmitter 26 transmits the modulated bits over the communication channel 40. The bit sequence which is modulated and transmitted is referred to as the transmitted bit sequence.

The receiving station 30 includes a receiver 32, demodulator 34 and a decoder 36. The receiver 32 and demodulator 34 transform the waveform or other signal received over the communication channel 40 back into a digital form that can be digitally processed. Thus, the receiver 32 demodulator 34 perform the opposite function of the modulator 22 and transmitter station 24. The output of the demodulator 34 is a bit sequence called the received bit sequence. Ideally, the received bit sequence would be a replica of the transmitted bit sequence. However, the transmitted signal is subjected to the adverse effects of the communication channel which result in bit errors in the received bit sequence. The received bit sequence is input to the decoder 36. The decoder 36 uses redundant information added by the encoder 22 to detect and correct bit errors caused by the adverse effects of the communication channel. Assuming that all bit errors are detected and corrected by the decoder 36, the output of the decoder 36 is a replica of the original information bit sequence. In real world communication systems, however, some errors are likely to remain even after the decoder 36.

In certain types of communication systems, such as mobile communication systems, it is desirable to know the number of bit errors induced by the adverse effects of the communication channel. For example, in a mobile communication system, the bit error rate is often used to determine the transmit power for a mobile terminal or base station. The mobile terminal will include signal quality measurement circuits for measuring the bit error rate. One common scheme used in mobile communication systems is called the re-encode and compare scheme. In this scheme, the output of the decoder, which is assumed to be a replica of the information bit sequence, is re-encoded using the same code as the transmitter. The re-encoded bits should therefore be the same as the transmitted bits. The re-encoded bits are compared the demodulated bits output from the demodulator to yield an estimate of the bit error rate caused by the communication channel 40. The present invention is an improvement in the re-encode and compare scheme that has been used in a mobile communication system.

Figure 2:
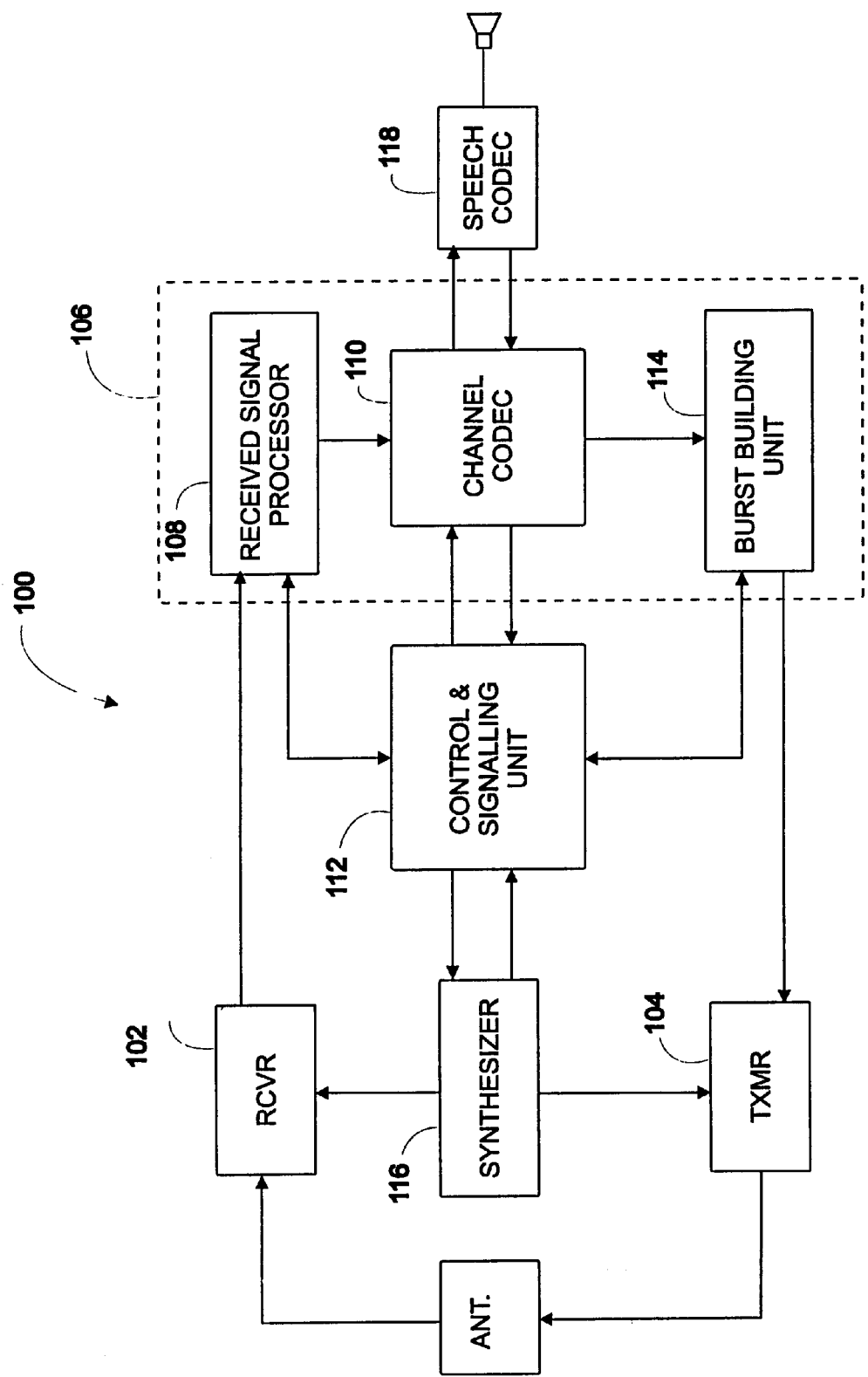
FIG. 2 is a block diagram of a mobile terminal used in a mobile communication system.

Referring now to FIG. 2, there is shown a schematic diagram of a mobile terminal 100 for a mobile communication system which utilizes the signal quality measurement method of the present invention. The mobile terminal is indicated generally by the numeral 100. The mobile terminal 100 includes a burst receiver 102 to receive transmitted signals and a burst transmitter 104 for transmitting signals. A signal processing unit 106 processes signals passed to it by the receiver 102 and prepares signals for transmission by the transmitter 104. The signal processing unit 106 includes a received signal processor 108, a transmit signal processor 114, and a channel codec 110. The received signal processor 108 includes a demodulator and demultiplexer to extract the transmitted bit stream from a received burst and to sort the received information from the different time slots and frames into their appropriate logical channels. The received signal processor 108 also includes a power measurement circuit to measure the strength of the received signal, and a bit error determination circuit to determine received signal quality. The power and quality measurements are passed to the control and signaling unit 112. A channel codec 110 decodes the received bit sequence coming from the received signal processor 108. If the decoded bit stream is a speech frame, then the channel codec passes it to the speech codec 118. If the decoded bit stream is a signaling frame, it is passed to the control and signaling unit 112.

The control and signaling unit 112 performs all of the control functions of the mobile terminal. These functions include power control, and channel selection. To perform its control functions, the control and signaling unit 112 exchanges signaling messages with the base station or network. These signaling messages are prepared or processed in the control and signaling unit 112 and are passed to or received from the channel codec 110.

The burst building unit 114 prepare signals for transmission. The burst building unit places coded bit sequences received from the channel codec 110 in the appropriate burst structure and then adds the necessary training sequence bits, tail bits, and stealing flag. Burst building unit 114 includes a multiplexer and modulator. The multiplexer assigns each individual burst to a timeslot in a numbered frame. After the bit sequence is sorted and ordered the modulator impresses the bit sequence on the carrier frequency for transmission by the transmitter 104.

The frequency synthesizer 116 provides the internal timing references for the bit and frame clock as well as for the RF sources in the receiver and transmitter. A voltage controlled oscillator assumes a stable operating frequency as commanded by the control and signaling unit 112.

Figure 3:
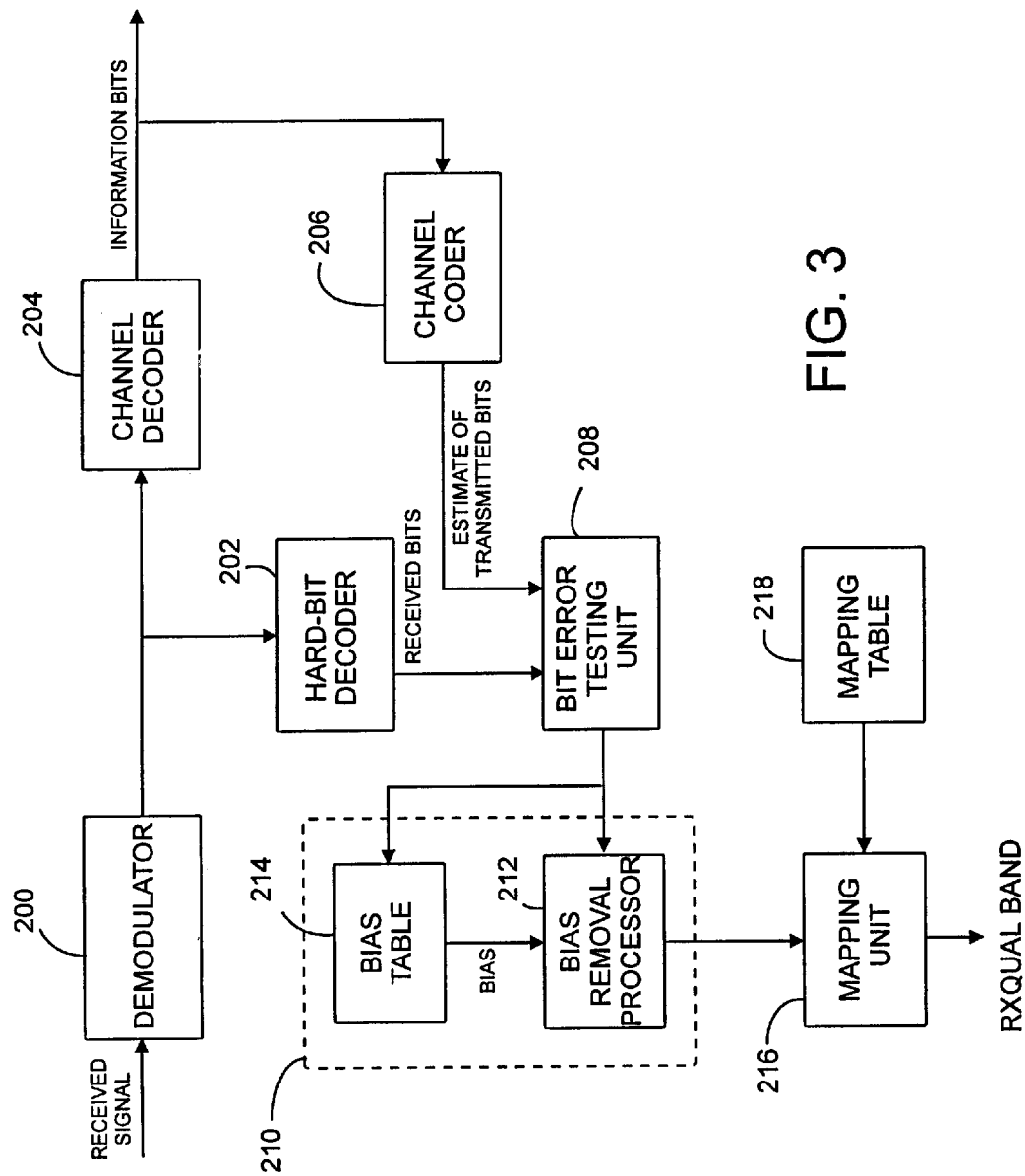
FIG. 3 is a block diagram of the received signal processor in the mobile terminal shown in FIG. 2.

FIG. 3 shows the received signal processor 108 in more detail. The received signal processor includes a demodulator 200, a hard-bit decoder 202, a channel decoder 204, a channel coder 206, a bit error testing unit 208, a bias removing unit 210, and a mapping unit 216. The demodulator 200 demodulates the received signal to produce a soft estimate of the received bits. The estimated bits output from the demodulator 200 are passed to the hard-bit decoder 202 and the channel decoder 204. The hard-bit decoder 202 converts the soft estimate output from the demodulator 200 into a hard estimate of the received bit sequence. The channel decoder 204 produces an estimate of the information bit sequence from the received bit sequence and knowledge of the channel code used to encode the information bit sequence prior to transmission. Assuming that all channel errors are detected and corrected by the channel decoder 204, the output of the channel decoder 204 should be a replica of the information bit sequence that was encoded and transmitted.

The output from the channel decoder 204 is passed to a channel coder 206. The channel coder 206 re-encodes the decoded bits output from the channel decoder 204 using the same coding algorithm that is used by the transmitter. The output from the channel coder 206 is then passed to the bit-error testing unit 208 along with the output from the hard-bit decoder 202. The bit-error testing unit 208 compares the re-encoded bits from the channel coder 204 to the demodulated bits from the hard-bit decoder 202 to derive an estimate of the channel bit error rate (CER). The CER is a measure of the bit errors that occur during transmission of the signal from the transmitter to the receiver.

As previously indicated, if there are no errors after the channel decoder 204, re-encoding of those bits should give the exact bits that were transmitted. Thus, comparison those bits with the output of the demodulator 202 should give the exact estimate of the CER. If there are some bit-errors after the channel decoder 204, the re-encoding will not give the actual bits that are transmitted but should be very close to the transmitted bits. In this case, the estimated CER will vary from the actual CER to some degree.

It has been discovered that the difference between the estimated CER output from the bit error testing unit 208 and the actual CER depends on the number of bit errors following the channel decoder 204. The estimated CER has a larger deviation for bad channels (i.e. channels with relatively high bit error rates) than for good channels (i.e. channels with relatively low bit error rates). In particular, it has been found that the statistical mean of the deviation is biased toward one direction and is a function of the actual CER. This bias can be estimated for any given system for various channel conditions. Removing the bias from the estimated CER output from the bit error testing unit 208 therefore improves performance under most channel conditions.

Returning now to FIG. 3, the output from the bit error testing unit 208 is passed to a bias removal unit 210 that includes a bias removal processor 212 and a bias table 214. The function of the bias removal unit 210 is to remove the bias from the estimated CER output from the bit error testing unit 208. The bias table 214 is stored in a permanent memory. The bias removal table 214 contains bias adjustments corresponding to various estimated CER's. The bias removal processor 212 uses the bias adjustments stored in the bias removal table 214 to map the estimated CER to a refined estimate of the CER.

Table 1 is an example of a bias removal table 214. The first two columns of Table 1 specify a range for the estimated CER output from the bit error testing unit 208. The third column of Table 1 shows the bias adjustment corresponding to each CER range. When the estimated CER is output from the bit error testing unit 208, the bias removal processor 212 makes the corresponding bias adjustment using the bias removal table 214. For example, if the estimated CER is 5.8%, then the bias removal processing unit 212 would add 0.2% to the estimated CER to arrive at a refined estimate of the CER equal to 6.0.

TABLE 1

Bias Removal Table

| Range (%) | | |
|---|---|---|
| Start (>) | End (<) | Bias Adjustment |
| 3.7 | 4.6 | 0 |
| 4.6 | 5.6 | 0.1 |
| 5.6 | 6.6 | 0.2 |
| 6.6 | 7.9 | 0.3 |
| 7.9 | 9.1 | 0.4 |
| 9.1 | 10.5 | 0.7 |
| 10.5 | 11.9 | 0.8 |
| 11.9 | — | 0 |

The bias removal table 214 is computed in advance, as will be described in more detail below, and is stored in a permanent memory in the mobile unit 100. The bias removal processor 212 may be a dedicated processor or alternatively may be a time shared processor that performs other functions as well.

The enhanced CER estimate from the bias removal unit 210 is passed to the mapping unit 216. Mapping unit 216 maps the enhanced estimate of the CER to a signal quality band. Each signal quality band corresponds to a specified range in the CER. In the preferred embodiment of the invention, there are a total of 16 signal quality bands referred to as RXQUAL bands. Each signal quality band is represented by a four bit signal which is transmitted by the mobile station 100 to base station 14. A mapping table 218 is stored in a permanent memory in the mobile station 100. The mapping unit 216 compares the refined estimate of the CER to the mapping table stored in memory to determine the corresponding signal quality band. The signal quality measurement is then passed to the control and signaling unit 112 to use in performing the control functions for the mobile station 100.

Figure 4:
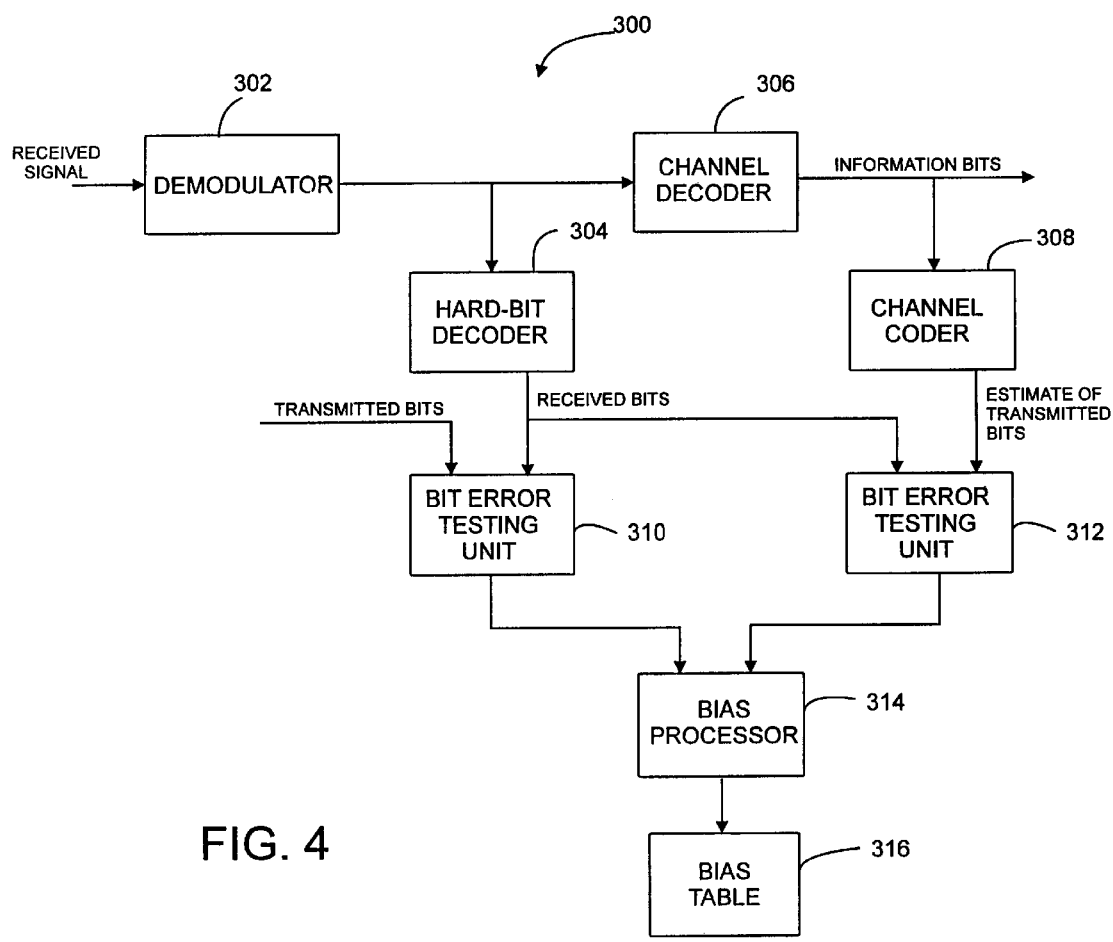
FIG. 4 is a block diagram of an apparatus for generating bias tables used by the received signal processor.

FIG. 4 illustrates the method used to generate the bias table 214 used in the present invention. The bias table generating device indicated generally as 300, includes a demodulator 302 for demodulating a received signal. The demodulator 302 produces a soft estimate of the received bit sequence. The soft estimate is input to a hard bit decoder 304 and channel decoder 306. The hard bit decoder 304 produces a hard estimate of the received bit sequence. The output of the hard bit decoder 304 is input to a first bit error testing unit 310 along with the actual transmitted bit sequence. The bit error testing unit 310 compares the received bit sequence output from the hard bit decoder 304 to the actual transmitted bits to determine the actual channel bit error rate. The channel decoder 306 receives the estimate of the received bit sequence from the demodulator 302 and produces an estimate of the information bit sequence based on a priori knowledge of the channel code used to encode the information bit sequence. The estimated information bit sequence output from the channel decoder 304 is re-encoded by a channel coder 308. Again, assuming that all errors are detected and corrected by the channel decoder 306, the output of the channel coder 308 should be a replica of the transmitted bit sequence. In practice, however, the output of the channel decoder 306 is likely to contain some bit errors. The output of the channel coder 308 along with the estimate of the received bit sequence from the hard bit decoder 304 is input to a second bit error testing unit 312. The bit error testing unit 312 compares the re-encoded bits from the channel coder 308 to the demodulated bits from the hard bit decoder 302 to derive an estimate of the channel bit error rate.

The actual channel bit error rate from the bit error testing unit 310 and the estimated channel bit error rate from the bit error testing unit 312 are input to a bias processor 314. The bias processor 314 compares the actual channel bit error rate from the bit error testing unit 310 to the estimated channel bit error rate from the bit error testing unit 312 to determine the bias on each estimate. This process is repeated over many measurement periods to obtain the bias on many estimates of the channel bit error rate. Bias values over many measurement periods are collected. The mean of the collected bias values is then computed. Bias values are computed in this manner for various signal levels and channel conditions. These bias values make up the bias table 214.

The re-encode and compare scheme of the present invention has been simulated and compared with a standard re-encode and compare scheme without bias removal. Table 2 gives the performance of the standard re-encode and compare scheme before any bias removal for various types of channels. In Table 2, the success rate is the probability that the correct signal quality band is reported by the mobile station 100. Assuming that a minimum success rate of 70% is required, it is seen that the standard re-encode and compare scheme provides adequate performance in all signal quality bands except RXQUAL15 in an AWGN channel. However, the standard re-encode and compare scheme has problems meeting the minimum success rate in higher bands for other types of channels.

TABLE 2

| Signal Quality Band | CER Assumed Value (%) | Specified Success-Rate (%) | Success Rate | | | | |
|---|---|---|---|---|---|---|---|
| | | | AWGN (%) | Rician k = 9 dB 100 km/hr (%) | Rician k = 6 dB 100 km/hr (%) | Rician k = 9 dB 2 km/hr (%) | Rician k = 6 dB 2 km/hr (%) |
| Rxqual_8 | 4.2 | >70 | 100 | 99.4 | 98.0 | 92.7 | 86.1 |
| Rxqual_9 | 5.1 | >70 | 100 | 98.8 | 90.7 | 90.9 | 65.3 |
| Rxqual_10 | 6.1 | >70 | 100 | 94.5 | 82.4 | 80.6 | 50.7 |
| Rxqual_11 | 7.3 | >70 | 100 | 95.2 | 81.5 | 70.6 | 41.5 |
| Rxqual_12 | 8.5 | >70 | 99.6 | 86.1 | 62.6 | 44.4 | 20.7 |
| Rxqual_13 | 9.8 | >70 | 99.6 | 71.9 | 42.1 | 37.5 | 11.9 |
| Rxqual_14 | 11.2 | >70 | 83.8 | 31.1 | 13.9 | 9.9 | 2.8 |
| Rxqual_15 | 12.5 | >70 | 63.2 | 19.3 | 10.4 | 36.8 | 24.1 |

TABLE 3

| Signal Quality Band | BER (%) | Bias on the Estimated CER (%) |
|---|---|---|
| Rxqual_8 | 3.7 < BER < 4.6 | 0 |
| Rxqual_9 | 4.6 < BER < 5.6 | 0 |
| Rxqual_10 | 5.6 < BER < 6.6 | 0 |
| Rxqual_11 | 6.6 < BER < 7.9 | 0.05 |
| Rxqual_12 | 7.9 < BER < 9.1 | 0.2 |
| Rxqual_13 | 9.1 < BER < 10.5 | 0.3 |
| Rxqual_14 | 10.5 < BER < 11.9 | 0.4 |
| Rxqual_15 | 11.9 < BER | 0 |

Table 3 gives the bias values in the estimated CER for an AWGN channel. Table 4 gives the performance of the re-encode and compare scheme of the present invention after removing the bias using the values shown in Table 3. As shown in Table 4, the present invention meets the minimum performance requirement for all quality bands for an AWGN channel. Removing the bias for AWGN also improves performance in Rician channels.

TABLE 4

| Signal Quality Band | CER Assumed Value (%) | Specified Success-Rate (%) | AWGN (%) | Success Rate | | | |
|---|---|---|---|---|---|---|---|
| | | | | Rician k = 9 dB 100 km/hr (%) | Rician k = 6 dB 100 km/hr (%) | Rician k = 9 dB 2 km/hr (%) | Rician k = 6 dB 2 km/hr (%) |
| Rxqual_8 | 4.2 | >70 | 100 | 99.4 | 98.0 | 92.7 | 86.1 |
| Rxqual_9 | 5.1 | >70 | 100 | 98.8 | 90.7 | 90.9 | 65.3 |
| Rxqual_10 | 6.1 | >70 | 100 | 94.5 | 82.4 | 80.6 | 50.7 |
| Rxqual_11 | 7.3 | >70 | 100 | 94.9 | 81.5 | 70.6 | 41.5 |
| Rxqual_12 | 8.5 | >70 | 100 | 87.3 | 65.2 | 47.9 | 22.3 |
| Rxqual_13 | 9.8 | >70 | 100 | 87.7 | 65.1 | 51.4 | 19.0 |
| Rxqual_14 | 11.2 | >70 | 97.9 | 65.0 | 34.6 | 28.9 | 7.5 |
| Rxqual_15 | 12.5 | >70 | 94.3 | 50.7 | 29.7 | 50.2 | 34.4 |

Table 5 gives the bias values in the estimated CER in a Rician k=9 dB, 100 km/hr channel. Table 6 gives the performance of the re-encode and compare scheme after bias removal using the values in Table 5. As shown in Table 6, the present invention can meet the minimum performance requirement for all quality bands in a Rician k=9 dB, 100 km/hr channel, as well as an AWGN channel. There is some degradation in the performance in an AWGN channel as compared to the previous example, but the performance is well within the acceptable levels. Table 6 also shows an improvement in each of the Rician channels.

TABLE 5

| Signal Quality Band | BER (%) | Bias on the Estimated CER (%) |
|---|---|---|
| Rxqual_8 | 3.7 < BER < 4.6 | 0 |
| Rxqual_9 | 4.6 < BER < 5.6 | 0 |
| Rxqual_10 | 5.6 < BER < 6.6 | 0.05 |
| Rxqual_11 | 6.6 < BER < 7.9 | 0.15 |
| Rxqual_12 | 7.9 < BER < 9.1 | 0.3 |
| Rxqual_13 | 9.1 < BER < 10.5 | 0.5 |
| Rxqual_14 | 10.5 < BER < 11.9 | 0.8 |
| Rxqual_15 | 11.9 < BER | 0 |

TABLE 6

| Signal Quality Band | CER Assumed Value (%) | Specified Success-Rate (%) | AWGN (%) | Success Rate | | | |
|---|---|---|---|---|---|---|---|
| | | | | Rician k = 9 dB 100 km/hr (%) | Rician k = 6 dB 100 km/hr (%) | Rician k = 9 dB 2 km/hr (%) | Rician k = 6 dB 2 km/hr (%) |
| Rxqual_8 | 4.2 | >70 | 100 | 99.4 | 98.0 | 92.7 | 86.1 |
| Rxqual_9 | 5.1 | >70 | 100 | 98.8 | 90.7 | 90.9 | 65.3 |
| Rxqual_10 | 6.1 | >70 | 99.4 | 94.5 | 82.4 | 80.6 | 50.7 |
| Rxqual_11 | 7.3 | >70 | 99.8 | 96.1 | 85.7 | 73.6 | 45.6 |
| Rxqual_12 | 8.5 | >70 | 97.4 | 91.1 | 75.3 | 55.6 | 25.6 |
| Rxqual_13 | 9.8 | >70 | 94.3 | 92.8 | 71.4 | 59.1 | 20.8 |
| Rxqual_14 | 11.2 | >70 | 88.9 | 84.5 | 54.3 | 43.7 | 13.2 |
| Rxqual_15 | 12.5 | >70 | 99.6 | 83.6 | 61.2 | 68.6 | 44.6 |

Table 7 gives the bias values in the estimated CER for a Rician k=6 dB, 100 km/hr channel. Table 8 gives the performance of the re-encode and compare scheme of the present invention after the bias is removed using the values shown in Table 7. This scheme gives better performance than before in the Rician channels with a slight degradation in the AWGN channel. Again, performance in the AWGN channel is well within acceptable levels.

TABLE 7

| Signal Quality Band | BER (%) | Bias on the Estimated CER (%) |
|---|---|---|
| Rxqual_8 | 3.7 < BER < 4.6 | 0 |
| Rxqual_9 | 4.6 < BER < 5.6 | 0.1 |
| Rxqual_10 | 5.6 < BER < 6.6 | 0.2 |
| Rxqual_11 | 6.6 < BER < 7.9 | 0.3 |
| Rxqual_12 | 7.9 < BER < 9.1 | 0.4 |
| Rxqual_13 | 9.1 < BER < 10.5 | 0.7 |
| Rxqual_14 | 10.5 < BER < 11.9 | 0.8 |
| Rxqual_15 | 11.9 < BER | 0 |

TABLE 8

| | | | Success Rate | | | | |
|---|---|---|---|---|---|---|---|
| Signal Quality Band | CER Assumed Value (%) | Specified Success-Rate (%) | AWGN (%) | Rician k = 9 dB 100 km/hr (%) | Rician k = 6 dB 100 km/hr (%) | Rician k = 9 dB 2 km/hr (%) | Rician k = 6 dB 2 km/hr (%) |
| Rxqual_8 | 4.2 | >70 | 100 | 99.4 | 98.0 | 92.7 | 86.1 |
| Rxqual_9 | 5.1 | >70 | 99.3 | 97.5 | 88.4 | 90.9 | 65.3 |
| Rxqual_10 | 6.1 | >70 | 97.4 | 94.5 | 89.6 | 82.7 | 56.0 |
| Rxqual_11 | 7.3 | >70 | 96.1 | 96.1 | 93.9 | 85.0 | 54.8 |
| Rxqual_12 | 8.5 | >70 | 91.8 | 93.0 | 87.3 | 71.8 | 36.4 |
| Rxqual_13 | 9.8 | >70 | 80.3 | 92.3 | 78.6 | 65.9 | 23.2 |
| Rxqual_14 | 11.2 | >70 | 80.9 | 82.0 | 69.7 | 49.3 | 16.0 |
| Rxqual_15 | 12.5 | >70 | 99.6 | 83.8 | 63.0 | 70.6 | 48.0 |

As the test data shows, removing the bias should improve performance of the re-encode and compare scheme. Removing the bias for AWGN should improve its performance in AWGN. Since it also removes some of the bias for other channels, it should give some performance improvement in the other channels as well. Removing the bias for Rician channels should improve its performance in those channels, but will give some degradation in AWGN due to the large offset in bias between those channels. Hence, the selection of the bias values to remove depends on the performance requirement that the receiver needs to meet.

The re-encode and compare scheme of the present invention may also be used in cases where part of the transmitted bit sequence in a transmitted frame is block coded prior to convolutional coding. For example, in the ACeS system, a satellite based mobile communication system, 45 out of a total of 72 bits per speech frame are channel coded. Those 45 bits include 12 class 1 bits and 33 class 2 bits. The class 1 bits are protected by a block code. These 12 bits are referred to herein as the protected bits. The protected class 1 bits and the unprotected class 2 bits are combined and coded by a convolutional coder. In the past only frames passing the error detection at the receiver are re-encoded.

The DAMPS system also divides the channel coded bits into protected and unprotected classes, however, the protected and unprotected bits are separately channel coded. In the past, only the protected bits were re-encoded and then only if the frame passed a CRC check.

Figure 5:
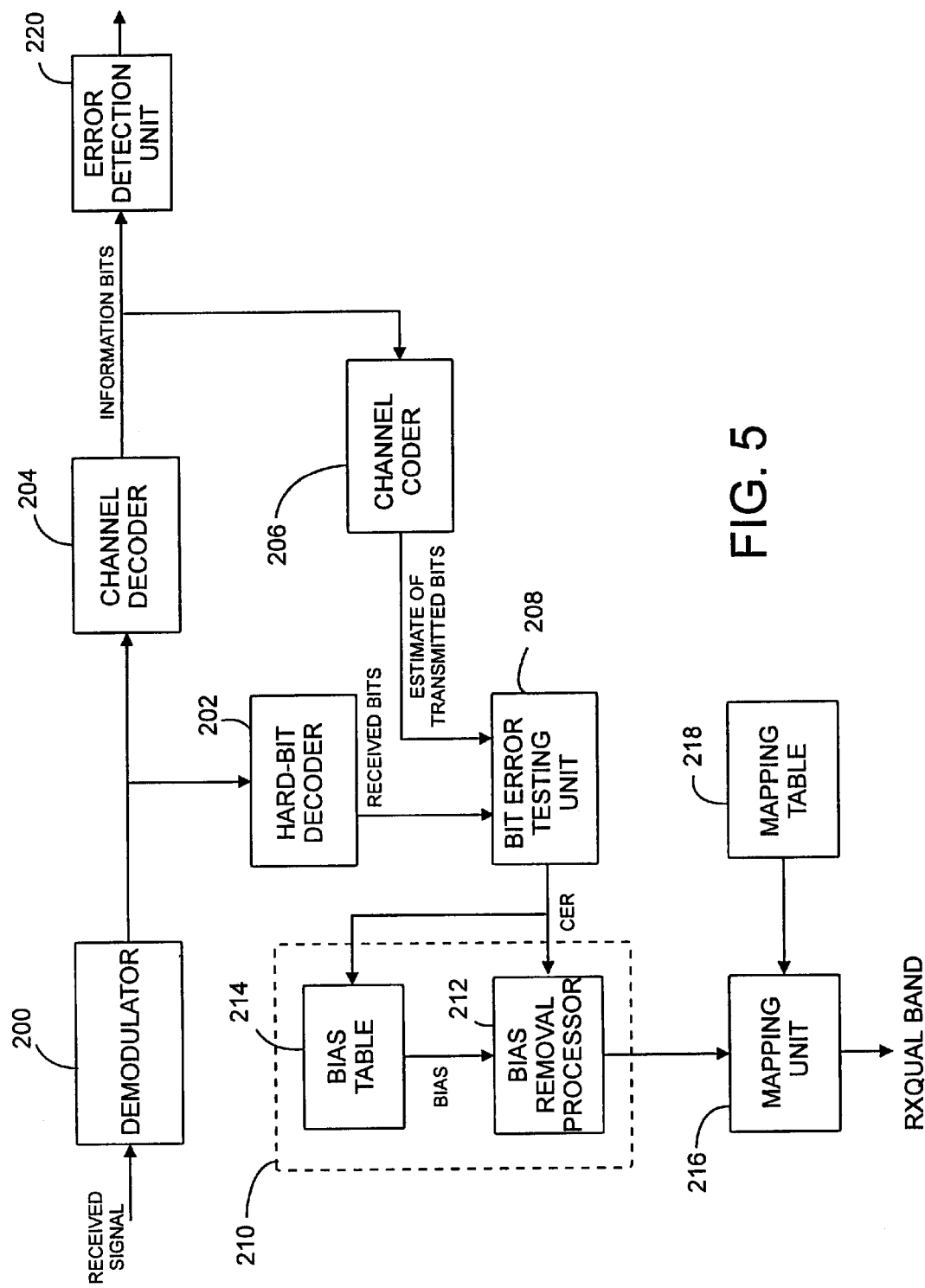
FIG. 5 shows a received signal processor incorporating the present invention which employs block coding for selected bits.

FIG. 5 shows an implementation of the received signal processor 108 that may be used when only part of the bits are protected by a block code. The received signal processor 108 shown in FIG. 5 is essentially the same as the received signal processor 108 of FIG. 3. The received signal processor in FIG. 5 differs in that it includes an error detection unit 220 after the channel decoder 204. The output of the channel decoder 204 is input to the error detection unit 220 and to the channel coder 206 The tap for the channel coder 206 is placed in front of the error detection unit 220. The error detection unit 220 performs a CRC check on each frame following the channel decoder 204. In the past, only frames passed by the error detection unit were re-encoded. In the present invention all of the channel coded bits are re-encoded by the channel coder 206. This re-encoding is performed on all frames, even those that fail the CRC check at the error detection unit 220. As previously described, the re-encoded bits are compared to the estimate of the transmitted bit sequence output from the hard bit decoder 202 to derive an estimate of the channel bit error rate. This initial estimate is passed to the bias removal unit 210 which generates a refined estimate of the bit error rate. The refined estimate output from the bias removal unit 210 is then output to the mapping unit 216 and is mapped to an RXQUAL band. Since the present invention re-encodes all channel coded bits, even when part of the bits are protected by a block code, it does not suffer from the same disadvantages as prior art techniques.

The present invention provides improved performance as compared against prior art re-encode and compare schemes without bias detection. The present invention also gives improved performance where only part of the transmitted bits are protected by a block code.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. In a digital communication system, a method for determining the bit error rate that occurs in a bit sequence transmitted from a transmitting station to a receiving station, said method comprising:

a) demodulating a received signal at said receiving station to obtain a received bit sequence;

b) decoding said received bit sequence to obtain an estimate of an information bit sequence that was encoded and transmitted by said transmitting station;

c) re-encoding said estimate of said information bit sequence to obtain an estimate of a transmitted bit sequence transmitted by said transmitting station;

d) comparing said received bit sequence and said estimate of said transmitted bit sequence to obtain an initial estimate of the bit error rate in said received bit sequence;

e) correcting said initial estimate of said bit error rate to obtain an adjusted estimate of the bit error rate in said received bit sequence.

2. The method according to claim 1 further including mapping the adjusted estimate of the bit error rate to a signal quality band.

3. The method according to claim 1 wherein the initial estimate of said bit error rate is corrected by removing bias from said initial estimate to produce said adjusted estimate of the bit error rate.

4. The method according to claim 3 including storing bias adjustments in a memory in said receiving station, and correcting said bias in said initial estimate of said bit error rate by applying said bias adjustments stored in said memory.

5. The method according to claim 1 wherein the digital communication system is a satellite communication system.

6. The method according to claim 1 wherein the steps of demodulating, decoding, re-encoding, comparing and correcting are performed by software running on said receiving station.

7. In a digital communication system, a method for determining the bit error rate that occurs in a bit sequence transmitted from a transmitting station to a receiving station, said method comprising:
   a) coding an information bit sequence to produce a transmitted bit sequence for transmission to a receiving station;
   b) modulating said transmitted bit sequence onto a carrier for transmission to said receiving station, wherein said transmitted signal is corrupted during transmission to said receiving station;
   c) receiving the corrupted signal at said receiving station;
   d) demodulating the corrupted signal received at said receiving station to obtain a received bit sequence;
   e) decoding said received bit sequence to obtain an estimate of the information bit sequence that was encoded and transmitted by said transmitting station;
   f) re-encoding said estimate of said information bit sequence to obtain an estimate of the transmitted bit sequence transmitted by said transmitting station;
   g) comparing said received bit sequence and said estimate of said transmitted bit sequence to obtain an initial estimate of the bit error rate in said received bit sequence;
   h) correcting said initial estimate of said bit error rate to obtain an adjusted estimate of the bit error rate in said received bit sequence.

8. The method according to claim 7 further including mapping the adjusted estimate of the bit error rate to a signal quality band.

9. The method according to claim 7 wherein the initial estimate of said bit error rate is corrected by removing bias from said initial estimate to produce said adjusted estimate of the bit error rate.

10. The method according to claim 9 including storing bias adjustments in a memory in said receiving station, and correcting said bias in said initial estimate of said bit error rate by applying said bias adjustments stored in said memory.

11. The method according to claim 7 wherein the step of encoding said information bit sequence includes dividing bits in said information bit sequence into protected and unprotected bits, and block coding said protected bits in said information sequence, wherein errors in said protected bits can be detected at said receiving station.

12. The method according to claim 11 further including the step of detecting errors in the estimate of said transmitted bit sequence corresponding to the protected bits in said information bit sequence.

13. The method according to claim 12 wherein the re-encoded bits include both protected and unprotected bits.

14. The method according to claim 7 wherein the digital communication system is a satellite communication system.

15. The method according to claim 7 wherein the steps of demodulating, decoding, re-encoding, comparing and correcting are performed by software running on said receiving station.

16. An apparatus for measuring the bit error rate in a signal comprising:
   a) a demodulator for demodulating a received signal to produce a received bit sequence;
   b) a decoder for decoding the received bit sequence to produce an estimate of an information bit sequence contained in said received bit sequence;
   c) a channel coder for coding said estimate of said information bit sequence to produce an estimate of the transmitted bit sequence;
   d) a bit error testing unit for comparing said received bit sequence to said estimate of said transmitted bit sequence to produce an estimate of said bit error rate in said received bit sequence;
   e) a bias removing unit coupled to said bit error testing unit to remove bias in said estimate of said bit error rate to produce an adjusted estimate of said bit error rate.

17. The measuring apparatus according to claim 16 further including a mapping unit to map said adjusted estimate of said bit error rate to a signal quality band.

18. The apparatus according to claim 16 further including a memory operatively associated with the bias removing unit for storing bias adjustments.

19. A digital communication system comprising:
   a) an encoder for encoding an information bit sequence to produce a transmitted bit sequence;
   b) a modulator for modulating the transmitted bit sequence to produce a transmitted signal;
   c) a transmitter for transmitting the transmitted signal over a communication channel, wherein said transmitted signal is corrupted by the communication channel;
   d) a receiver for receiving a received signal corresponding to a transmitted signal transmitted from the transmitting station;
   e) a demodulator for demodulating the received signal to produce a received bit sequence;
   f) a decoder for decoding the received bit sequence to produce an estimate of the information bit sequence;
   g) a bit error testing unit operatively coupled to said demodulator and said decoder for comparing said received bit sequence and said estimate of said information bit sequence to produce an estimate of the channel bit error rate caused by the communication channel; and
   h) a bias removing unit coupled to said bit error testing unit to remove bias in said estimate of said bit error rate to produce an adjusted estimate of said bit error rate.

20. The digital communication system according to claim 19 further including a mapping unit to map said adjusted estimate of said bit error rate to a signal quality band.

21. The digital communication system according to claim 19 further including a memory operatively associated with the bias removing unit for storing bias adjustments.

22. The digital communication system according to claim 19 wherein said encoder is operative to block code selected bits in said information bit sequence.

23. The digital communication system according to claim 22 further including an error detecting unit coupled to said decoder to detect errors in the bits which were block coded by said encoder.

24. The digital communication system of claim 23 wherein the digital communication system is a satellite communication system.

25. In a digital communication system, a method for determining the bit error rate that occurs in a bit sequence transmitted from a transmitting station to a receiving station, said method comprising:
   a) generating an initial estimate of the bit error rate in a received bit sequence at the receiving station;
   b) determining a bias adjustment based on said initial estimate of said initial estimate of said bit error rate;
   c) applying said bias adjustment to said initial estimate of said bit error rate to generate a refined estimate of said bit error rate.

26. The digital communication system of claim 25 wherein the digital communication system is a satellite communication system.

27. The method of claim 25 wherein determining a bias adjustment based on said initial estimate of said bit error rate comprises retrieving said bias adjustment from a lookup table stored in said receiving station.

28. The method of claim 27 further comprising pre-computing said bias adjustments for specified values of said initial bit error rate and storing said pre-computed bias adjustments in a permanent memory in said receiving station.

29. An apparatus for generating a bias table used to refine an estimate of the bit error rate in a received bit sequence, comprising:
   a) a demodulator for demodulating a received signal to produce a received bit sequence;
   b) a decoder for decoding the received bit sequence to produce an estimate of an information bit sequence contained in the received bit sequence;
   c) a channel coder for coding said estimate of said information bit sequence to produce an estimate of a transmitted bit sequence;
   d) a first bit error testing unit for comparing said received bit sequence to said estimate of said transmitted bit sequence to produce an estimate of said bit error rate in said received bit sequence;
   e) a second bit error testing unit for comparing said received bit sequence to an actual transmitted bit sequence corresponding to the received bit sequence to determine the actual bit error rate in said received bit sequence;
   f) a bias processor operatively connected to said first and second bit error testing units for computing the bias in said estimated bit error rate based on the actual bit error rate from said second bit error testing unit and the estimated bit error rate from said first bit error testing unit.

* * * * *